United States Patent Office 3,362,891
Patented Jan. 9, 1968

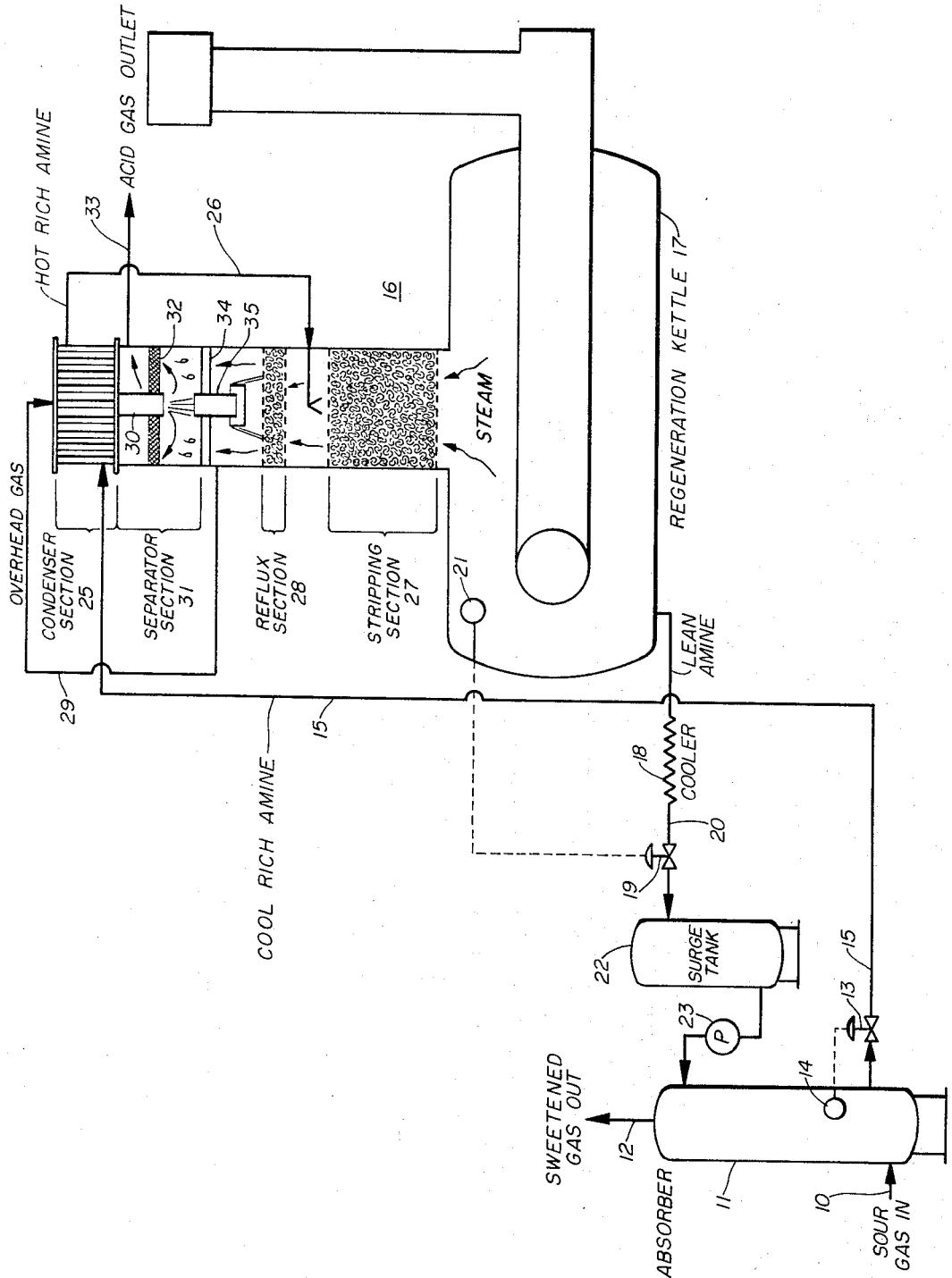

3,362,891
PROCESS AND APPARATUS FOR SEPARATING ACIDIC GAS SUCH AS HYDROGEN SULFIDE AND CARBON DIOXIDE FROM GASEOUS MIXTURES
Charles O. Meyers, Tulsa, Okla., assignor to Combustion Engineering, Inc., New York, N.Y., a corporation of Delaware
Filed May 12, 1965, Ser. No. 455,258
3 Claims. (Cl. 203—59)

ABSTRACT OF THE DISCLOSURE

A contact tower in which amine is used to sweeten gas is connected to a regeneration column for the amine. The rich amine is heat-exchanged with the vapors generated in the column before being regenerated in the column.

The present invention relates to a reflux system for an amine process. More specifically, the invention relates to using the cooling capacity of the rich amine solution to develop reflux liquid and directing the gas and liquid stream being cooled so as to avoid carry-over of the reflux liquid by the gas.

In amine systems it has been common to reduce the temperature of the sour overhead gas of the still column with an aerial cooler located at the base of the column. The liquid condensed from the gas has been pumped back to the top of the still column as reflux. The aerial cooler is an expense and if no electrical power is available, the pump power is a problem.

A principal object of the present invention is to provide heat exchange on the top of the still column which will utilize the relatively cool rich amine stream to cool the overhead gas and condense reflux liquid from this gas.

Another object is to flow the overhead gas downwardly from heat exchange with the cool rich amine solution to avoid the relatively large amount of vapors from carrying condensed reflux liquid to loss at the flare.

Another object is to provide positive separation of the condensed reflux liquid and gas following the condensing with the rich amine solution.

In one aspect, the invention contemplates a heat exchange structure mounted on the top of the still column. The rich amine, at the pressure of the absorber, is forced to the heat exchanger and into indirect exchange with the overhead gas of the still column. The heated, rich amine solution is dropped to the distillation section of the still column, after heat exchange, where it is flowed countercurrent with the vapors developed in the heater. The cooled overhead vapors of the still column have liquid condensed from them as the vapor and liquid are directed downward through the heat exchanger toward the distillation section of the still column. With this arrangement flow of the vapors upward against the descending condensate is avoided and there is less loss of liquid by it being carried to the flare for the gases.

Other objects, advantages and features of this invention will become apparent to one skilled in the art upon consideration of the written specification, appended claims, and attached drawing, wherein:

A complete system is illustrated in which a still column is sectioned to show the structure with which the invention is reduced to practice.

General amine process

The amine process is a continuous cyclic process for separating acidic gases such as hydrogen sulfide and carbon dioxide from gaseous mixtures.
The process utilizes a 15% aqueous solution of monoethanolamine as the treating agent. When this solution is intimately contacted in the absorber with gas containing hydrogen sulfide, the following chemical reaction takes place:

$$NH_2-CH_2-CH_2OH + H_2S \rightleftharpoons HSNH_3-CH_2-CH_2OH + Heat$$

Monoethanolamine + hydrogen sulfide
 Monoethanolamine-hydrosulfide

This is a reversible-equilibrium reaction with an increase in temperature shifting the equilibrium to the left. This means in effect that the cool amine solution first combines with hydrogen sulfide in the absorber. The amine-hydrosulfide is then heated, first by heat exchange and then with steam in the stripping still. This heating shifts the equilibrium to the left which liberates hydrogen sulfide and regenerates the monoethanolamine. The liberated $H_2S$ is removed from the system. The regenerated amine is cooled first by heat exchange and then by external means. And is then recirculated to the absorber to complete the cycle.

Carbon dioxide reacts in the same manner as hydrogen sulfide.

Quite often it is not necessary to remove carbon dioxide to meet sales specifications. However, the unit must be designed for total acid gas removal since the amine solution is not selective for $H_2S$ alone.

General flow pattern

To carry out the general process, the sour gas to be sweetened flows from its source not shown in the drawing. This gas may be routed through an inlet scrubber also not shown, although it could be a portion of the absorber. In any event, it is extremely important that any condensed liquids be removed from the gas stream.

The gas stream is depicted as being received from conduit 10 into absorber vessel 11. This gas rises countercurrently to the descending amine solution and exits through conduit 12. This purified gas flows from the top of the absorber to a processing plant, dehydration unit, compression, sales or other disposition.

A scrubber on the absorber outlet is very desirable to catch any amine solution carry-over that can happen during periods of upsets or unstable operation. Any amine caught in this outlet scrubber is automatically dumped back into the system via the amine surge tank. However, the present drawing does not include such a scrubber.

Lean amine solution flows down the absorber, countercurrent to ascending gas where it combines with hydrogen sulfide and carbon dioxide in the gas. The resulting enriched amine then leaves the bottom of the absorber. It flows through a dump valve 13, actuated by a liqiud level controller 14, in conduit 15.

The cool rich amine solution is then flowed to the regeneration system including still column 16 and still kettle 17. The hot regenerated amine flows from the still kettle through some form of cooler 18 under the control of valve 19 in conduit 20 as regulated from controller 21 which maintains a constant level in the kettle.

A surge tank 22 receives the regenerated amine. From this tank, a pump 23 removes the solution and discharges it to the top tray of absorber 11 to complete the cycle.

Still column

Only a few of the control systems required are shown in the drawing. The invention is in the structure of the still column and the method which can be carried out by the structure. It is obvious to one skilled in this art that many back-pressure valves, fuel gas controls, etc., are necessary in an actual reduction to practice of the complete system. The present disclosure obtains clarity by restricting its disclosure to the essential elements which embody the invention.

Returning to the stream of rich amine in conduit 15, it is shown as heated in an exchange structure 25 mounted on the top of still column 16. From this source of heat, the amine flows through conduit 26 and is released above stripping section 27.

Steam from kettle 17 rises in stripping section 27 against the descending amine from conduit 26. This steam heats the descending amine and sweeps the liberated acid gases up the still. Thus the basic regeneration of the amine is carried out.

The overhead vapors issuing from the stripping section 27 consist essentially of steam, amine vapor and acid gases. It is desirable to condense the steam of these vapors and return this condensate to contact all the ascending vapors as reflux in section 28. The present invention provides a unique method and structure to condense this steam.

In some instances the overhead vapor from the stripping section has been removed to a large cooler near the ground level of the unit. This required the condensate to be pumped up to the reflux section.

A water cooled condenser has been mounted on the top of the still column. The overhead vapor can be cooled in this manner, but water must be pumped up to the condenser.

A natural convection condenser has been mounted on the top of the still column. However, the degree of cooling with this type of condenser is dependent upon widely varying wind velocities and ambient temperatures.

The present invention solves this basic problem by providing heat exchange with the relatively cool rich amine at the top of the still column. The control of cooling is then positive and the condensate will flow by gravity down through the reflux section as reflux.

*Concurrent flow of overhead vapor and condensate*

The analogy between a glycol system and these amine systems will ineviatbly be drawn. However, the applicant points out that there is a tremendous difference between the reflux requirement of the two systems. Only a relatively small amount of the overhead vapors of the glycol system are glycol; 85% of the vapor is water vapor. In the amine system there is about 2¾ cubic feet of acid gas per gallon of amine solution fed into the stripping section. Then, the resulting vapors contain about 27½ cubic feet per gallon of reflux liquid condensed in heat exchanger 25. Obviously, this large volume of acid gas must be handled properly or it will sweep amine and reflux liquid out to the discharge.

The present invention contemplates removal of the overhead vapors above reflux section 28 through conduit 29. These vapors are then fed into condenser 25 downwardly. The cooling takes place as the vapors give up their heat to the relatively cool rich amine of conduit 15. The overhead vapors are in the order of 210° F. and the cool rich amine is in the order of 90° F. The steam of the vapors condenses and the two-phase stream is discharged from below the condenser at a temperature in the order of 140° F. An important point is that the invention provides for condensate and actid gas to flow in the same direction rather than from opposite directions. A separate section is provided in column 16 to separate the two phases.

*Condensate—Acid gas separation*

The condensate and acid gas are discharged downwardly, from cendenser 25, through downcomer conduit 30. Downcomer 30 extends down into a length of column 16 which is designated as separator section 31. In this volume, the acid gas is baffled to reverse its direction of flow and disengage from the condensate. In accordance with basic two-phase separation technique, a mist extractor element 32 is provided to catch liquid entrained by the gas which then passes out of the separator through conduit 33. The liquid gravitates to the bottom of section 31, on the top of partition 34, and then flows down through downcomer 35 which is liquid sealed on its lower end.

To keep the separated liquid from being heated by the overhead gases which is in the separator, partition 34 is of an insulating type. The condensate then flows down reflux section 28 to wash the amine back toward the stripping section.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. A still column comprising a steam stripping and amine regenerating still section for the treatment of alkanolamine solution in which acidic vapor selected from the group consisting of $H_2S$ and $CO_2$ is separated from the overhead vapor from the stripping section of the still column, including, a vertical column comprising a heat exchanger and condenser section at the top of the column for condensing vapor, a steam stripping section located in the lower portion of the column, a vapor-liquid phase separator section located in the still column above the stripping section and directly below the condenser section, conduit means for passing the overhead vapors from the stripping section through the heat exchanger in heat exchange with the relatively cool acidic vapor rich amine solution flowing downwardly through the condenser section prior to introduction of the amine into the stripping section and in concurrent flow downwardly with the condensate from the overhead vapors prior to flow of the same into the separator section, means for reversing the directional flow of vapor in the separator section, conduit means for discharging the said vapors from the separator section to waste, and means comprising a downcomer communicating with said separator section for flowing the condensate into counter-current flow with the vapors from the steam stripping section as reflux.

2. The column of claim 1 which includes a thermal insulation baffle between the separator section and the stripping section.

3. The method of separating acidic vapor selected from the group consisting of $H_2S$ and $CO_2$ as an overhead vapor from an acidic vapor rich alkanolamine solution which comprises the steps of introducting the acidic vapor rich amine solution into the top of the column having an upper heat exchanger and condensing zone, a condensate-vapor separator zone therebeneath, a reflux zone below the separator zone, a rising steam stripping zone below the reflux zone and a still section disposed at the bottom of the column for heating and regenerating the amine solution, introducing relatively cool acidic vapor rich amine solution into the top of the heat exchanger and condensing zone and in contact with the overhead vapor rising upwardly of the column, the overhead vapor being cooled by the amine solution to form liquid condensate and release acidic vapor, passing the condensate and acidic vapor downwardly concurrently to the separator zone wherein the vapor is baffled to reverse its direction of flow to separate from the liquid condensate wherein the vapor passes upwardly of the column, flowing the condensate thus separated downwardly of the column into the reflux zone, recycling acidic vapor separated from the condensate as overhead vapor upwardly and introducing it into the top of the condensing zone, removing a portion of the heated acidic rich amine solution from the heat exchanger and condensing zone, by-passing the separator and reflux zones, and introducing the same into the steam stripping zone, flowing liquid condensate from the reflux zone downwardly of the column in counter-current directional flow to the rising steam in the steam stripping zone, and passing the resultant amine liquid from the steam stripping zone into the heating and amine regenerating still section to recover lean amine solution for reuse to absorb acidic vapor.

References Cited

UNITED STATES PATENTS

| | | |
|---|---|---|
| 2,167,028 | 7/1939 | McGovern. |
| 2,570,291 | 10/1951 | Tyerman _____ 203—95 X |
| 2,614,904 | 10/1952 | Royer _____ 55—73 X |
| 2,701,750 | 2/1955 | Paulsen et al. _____ 260—584 |
| 2,738,964 | 3/1956 | Binder et al. _____ 202—158 X |
| 2,761,818 | 9/1956 | Draemel et al. ____ 260—584 X |
| 2,797,188 | 6/1957 | Taylor et al. _____ 260—584 X |
| 2,914,469 | 11/1959 | Anderson et al. ___ 203—95 X |
| 3,269,923 | 8/1966 | Roche et al. _____ 203—96 X |

NORMAN YUDKOFF, *Primary Examiner.*

F. E. DRUMMOND, *Assistant Examiner.*